United States Patent [19]
Gustin

[11] Patent Number: 5,195,462
[45] Date of Patent: Mar. 23, 1993

[54] DRINKING TROUGH

[75] Inventor: Jean P. Gustin, Charleville Mezieres, France

[73] Assignee: La Buvette S.A., Montherme, France

[21] Appl. No.: 790,032

[22] Filed: Nov. 12, 1991

[30] Foreign Application Priority Data

Nov. 12, 1990 [FR] France .................... 90 13979

[51] Int. Cl.⁵ .................................. A01K 7/06
[52] U.S. Cl. .............................. 119/75; 119/72
[58] Field of Search ............ 119/18, 75, 72, 72.5; 137/580, 801, 360, 513.7

[56] References Cited

U.S. PATENT DOCUMENTS

| | | | |
|---|---|---|---|
| 3,043,267 | 7/1962 | Blough | 119/72 |
| 4,214,607 | 7/1980 | Bouteille | 137/513.7 |
| 4,421,060 | 12/1983 | Frush et al. | 119/72.5 |
| 4,742,849 | 5/1988 | Prudhomme | 137/513.7 |

FOREIGN PATENT DOCUMENTS

| | | | |
|---|---|---|---|
| 661088 | 10/1935 | Fed. Rep. of Germany | 119/75 |
| 2363024 | 6/1975 | Fed. Rep. of Germany | 119/75 |
| 3610169 | 10/1986 | Fed. Rep. of Germany | 119/75 |
| 3721467A1 | 4/1988 | Fed. Rep. of Germany | |

Primary Examiner—John G. Weiss
Attorney, Agent, or Firm—Pennie & Edmonds

[57] ABSTRACT

A drinking trough comprises an elbow to which a water inlet pipe is attached and a spigot that extends above a basin, and is arranged along a back wall of the basin. A hole is in the back wall of the basin through which an end of the elbow is positioned. The spigot is positioned on the end of the elbow, and a screw attaches the elbow, the back wall and the spigot to each other. Water arriving through the elbow passes toward the outlet of the spigot.

10 Claims, 2 Drawing Sheets

DRINKING TROUGH

BACKGROUND OF THE INVENTION

The present invention relates to a drinking trough for animals such as cattle which is intended to be installed either in a barn or meadow.

Drinking troughs generally comprised of a spigot and a semi-spherical shaped basin that is mounted against a wall or on a post by mounting means. Generally, the back side of the basin protrudes above the basin. The spigot extends generally vertically into the basin and has a mechanism that can be pushed by the animal to introduce water into the basin. This mechanism includes a bar that is designed to lift a water inlet valve from its seat when the bar is pushed by the animal.

It is known to equip the bar with a device so that one can easily disassemble the bar and the valve without interrupting the water supply to the drinking trough. Due to this device, operations for maintaining the bar and cleaning the valve in the event of a leak can be done very quickly without providing water cut-off spigots in each drinking trough.

However, provisions have never been made to disassemble the spigot unit easily. The spigot unit is generally anchored to an elbow connected to the basin and disassembling the spigot often requires the complete dismantling of the drinking trough.

An object of present invention is to provide a new type of drinking trough in which it is possible to disassemble the spigot very quickly to obtain access to the water inlet pipe without disassembling the drinking trough.

SUMMARY OF THE INVENTION

In accordance with the present invention there is provided a drinking trough comprising a basin having a back wall with a hole therethrough, a conduit, such as an elbow, having first and second end portions, and a spigot. The first end portion of the elbow is attached to a source of fluid, such as a water inlet pipe, and the second end portion extends through the hole in the basin. The drinking trough includes means for detachably connecting the spigot to the second end portion of the conduit in a manner which allows water or fluid to flow from the conduit to the spigot. The preferred connecting means comprises a screw having a hollow axial bore and at least one aperture therein to allow fluid to flow from the conduit through the bore and aperture to the spigot.

BRIEF DESCRIPTION OF THE DRAWINGS

The invention will be better understood by the following description, together with the drawing, in which.

DETAILED DESCRIPTION OF THE PREFERRED EMBODIMENTS

Figure 1:
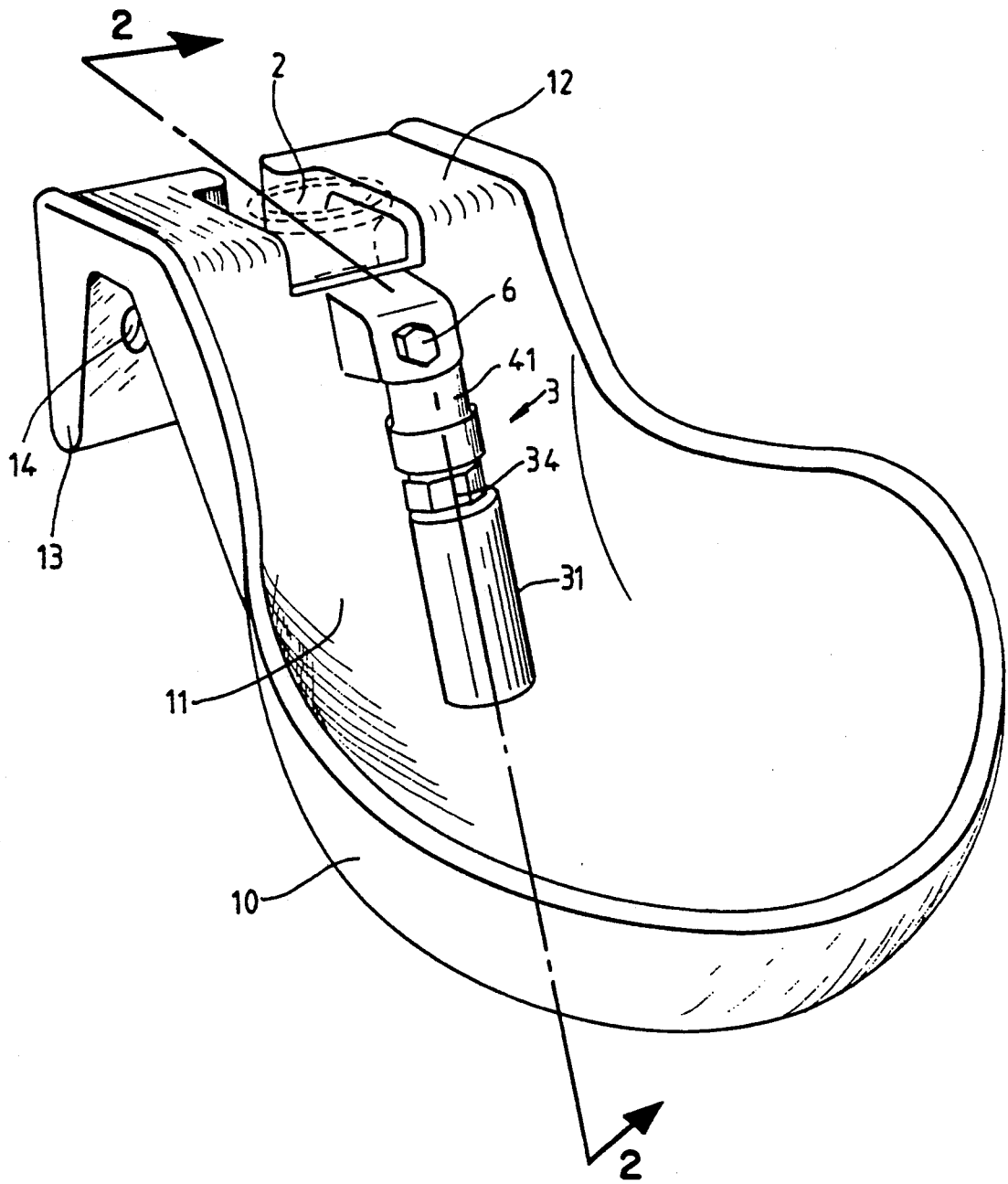
FIG. 1 is a perspective view of a drinking trough according to the present invention.

FIG. 1 shows a basin 10 of a drinking trough. Basin 10 comprises a back wall 11 along which a spigot 3 necessary for a supply of water extends.

Back wall 11 rises well above basin 10 and has a level portion 12 which ends in a vertical bend 13. Vertical bend 13, pointed downward in the example shown, comprises holes 14 therethrough. Holes 14 enable the installation of means for anchoring the drinking trough to a wall or post.

The water inlet pipe is not shown in the FIGS. Only elbow 2 to which the inlet pipe is connected is shown. The pipe may arrive from above, as shown, through an opening in the level portion 12, or it may arrive from below the drinking trough.

Figure 2:
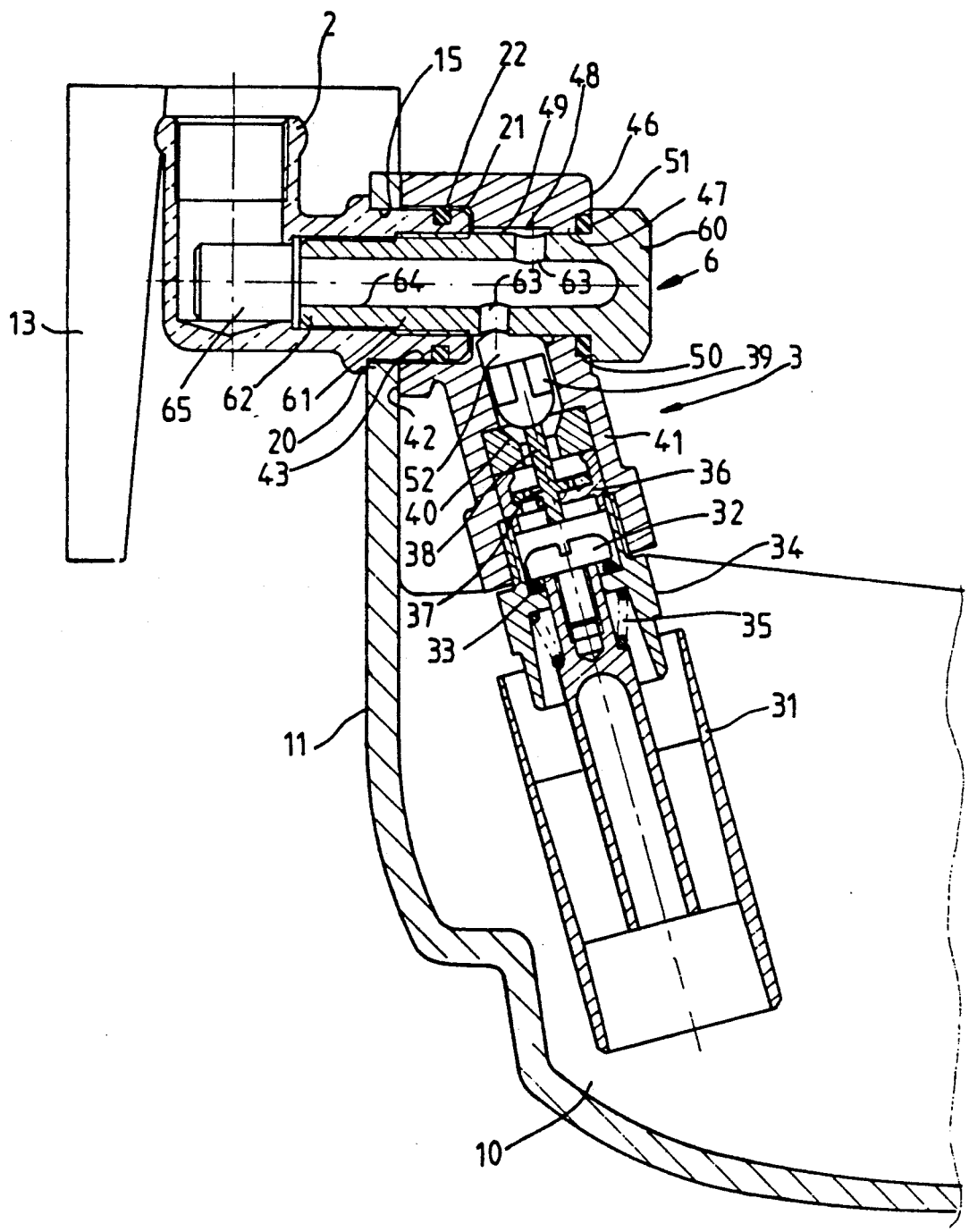
FIG. 2 is a view taken along line 2—2 of FIG. 1.

As shown in FIG. 2, elbow 2 is situated at the end of the water inlet pipe and extends through a hole 15 in the back wall 11 of the drinking trough. Elbow 2 has a peripheral shoulder 20 that limits its passage through hole 15. The end of elbow 2 which protrudes from back wall 11 has a circumferential groove 21 for the placement of a joint 22. Elbow 2 is threaded internally and externally, as described herein in detail, to be screw-anchored to back wall 11 and spigot 3.

Spigot 3 comprises a bar 31 that can be displaced by an animal when it wants to drink. Bar 31 has, at its end located inside spigot 3, a valve 32 that rests, when the bar as shown in the figure is in a resting position, on a seat 33 anchored to a removable spout 34. Bar 31 is moveable with respect to said spout 34 against a spring 35).

Thus, when an animal presses on bar 31, the bar acts on valve 32 to detach it from seat 33, thereby allowing water to pass into basin 10. As soon as the animal stops pressing on bar 31, bar 31 is returned to its initial position by spring 35, which sets valve 32 back on its seat 33 and cuts off the water supply.

Removable spout 34 has a nozzle comprising a cage 36 inside of which is positioned a barrel 37. Barrel 37 has a biasing stem 38 which constantly pushes a throttle valve 39 out of its seat 40.

Cage 36 has holes of different sizes, while barrel 37 has just one opening. Thus, it is possible to regular the flow from spigot 3 by positioning the opening in barrel 37 in front of a hole of a desired size in cage 36. This arrangement is well-known and is not depicted in detail.

Throttle valve 39 and its seat 40 are part of a spigot body 41, the lower end of which is screwed the removable spout 34.

Such an arrangement is well-known and is widely used for drinking troughs. The outside spout 34 is shaped like a six-sided nut so that it may be removed to provide easy access to the nozzle and valve 39 to adjust them during maintenance. When spout 34 is removed, biasing stem 38 of barrel 37 is removed with it, thereby allowing the throttle valve 39 to position itself on seat 40 and stop the water supply.

In most drinking troughs, spigot body 41 forms a single piece with water inlet elbow 2. Thus, it is difficult to obtain access to the pipe without removing the entire drinking trough from its support. According to the invention, spigot body 41 is shaped with a flat side 42 configured and dimensioned to be positioned against back wall 11. This flat side 42 comprises a bore 43 with a diameter slightly greater than the diameter of the end of elbow 2 that protrudes from back wall 11.

Bore 43 is extends through the entire upper portion of spigot body 41 to a second side 46. Flat side 46 is parallel to flat side 42. Bore 43 is stepped at side 46, and is referred to hereon as a bore 47. Bore 47 has a diameter equal to the diameter of the threaded portion of screw 6, described herein in detail. A facing 50 surrounds bore 47 for placement in a water-tight joint 51.

Between sides 42, 46, bore 43 has an intermediary portion 48 with a diameter greater than the diameter of bore 47.

Spigot body 41 has a second bore 52 that forms an angle generally greater than 90° with bore 43. Second bore 52 is close to back wall 11. Throttle valve 39 is positioned in bore 52. The device described above comprising removable spout 34 and bar 31 is arranged along the axis of bore 52.

Elbow 2 is positioned through hole 15 of back wall 11. Spigot 3 is attached thereto by threading Bore 43 of spigot body 41 on the protruding end of elbow 2 until flat side 42 is contact with back wall 11. The two parts thus positioned are anchored to each other, according to the invention, by screw 6 which is inserted through flat side 46 of spigot body 41.

Screw 6 has a head 60 and a body comprising two portions 61, 62. The length of portion 61 is such that its threaded end cooperates with the threaded end of elbow 2. Portions 61 ends with an extension 62 that engages an internal bore of elbow 2. When screw 6 is screwed into the threaded end of elbow 2, elbow 2 and spigot 3 are anchored to each other by pinching back wall 11. Joints 22, 51 assure that this assembly is water-tight.

The body of screw 6 is traversed by an axial bore 64 through which water arriving from the pipe and elbow 2 can flow. A portion 61 of screw 6 is in contact with the inside of bore 47, while a circumferential chamber 49 is formed around portion 61 by intermediary portion 48 of bore 43. Radial passages 63 traverse the body of screw 6 in order to connect chamber 49 to bore 64 of screw 6. By such an arrangement, the water from the pipe flows into elbow 2, axial bore 64, and then traverses channels 63 to enter chamber 49. The water then flows toward bore 52 and thus bar 31.

As can be seen, because the invention provides screw 6 which assures the anchoring of water inlet elbow 2, basin 1 and spigot 3 to each other while still providing for the passage of water, in the event of a problem, spigot 3 can be easily removed from the trough simply by removing screw 6. This provides easy access to the water inlet pipe with no need to disassemble the drinking trough from its support.

Another advantage of this arrangement is that a filter 65 can be provided at the end of screw 6 to prevent impurities from entering into spigot 3. When necessary, filter 65 can be accessed for cleaning by removing screw 6.

I claim:

1. A drinking trough, comprising:
   a basin having a back wall with a hole therethrough,
   a conduit having first and second end portions, the first end portion being attached to a source of fluid and the second end portion extending through the basin hole;
   a spigot; and
   means for detachably connecting the spigot to the second end portion of the conduit, wherein the connecting means includes a hollow axial bore having at least one aperture therein to allow fluid to flow from the conduit and through the bore and aperture to the spigot.

2. The drinking through of claim 1 wherein the end of axial bore of the connecting means which extends into the conduit includes a filter element.

3. A drinking trough, comprising:
   a basin having a back wall with a hole therethrough,
   an elbow having first and second end portions, the first end portion being attached to a source of fluid and the second end portion extending through the basin hole;
   a spigot; and
   means for detachably connecting the spigot to the second end portion of the elbow and including a screw extending through the spigot and threadably engaged with the second end portion of the elbow, in a manner that allows fluid to flow from the elbow through the screw and to the spigot, whereby the spigot may be detached from the elbow without disassembling the drinking trough.

4. The drinking trough of claim 3, wherein the elbow abuts a first side of the back wall and the spigot abuts a second side of the back wall, the screw being tightened to compress the back wall between the elbow and the spigot, thereby securing the elbow, the spigot and the back wall to each other.

5. The drinking trough of claim 4, wherein the spigot comprises first and second flat sides and a bore extending from the first flat side to the second flat side, the bore of the spigot at the first flat side being threaded on an outer threaded portion of the second end portion of the elbow.

6. The drinking trough of claim 5, wherein the bore of the spigot at the second flat side is stepped and has a diameter substantially equal to the internal diameter of the second end portion of the below.

7. The drinking trough of claim 6, wherein the spigot includes a bore at an intermediary portion thereof having a diameter greater than the diameter of the bore of the spigot at the second flat side to create a chamber which allows water to flow from the source through the screw and into the spigot.

8. The drinking trough of claim 7, wherein the screw has a head and body portion and is threaded into the interior bore of the elbow.

9. The drinking trough of claim 8, wherein the screw comprises an axial bore in the body portion into which water from the elbow enters, the axial bore being connected by at least one radial passage to a chamber formed between the outer surface of the body portion and the bore at the intermediary portion of the spigot.

10. The drinking trough of claim 9, wherein the body portion of the screw has a filter attached to an end thereof, the filter extending into the elbow.

* * * * *